(12) United States Patent
Mielenz et al.

(10) Patent No.: US 11,250,695 B2
(45) Date of Patent: Feb. 15, 2022

(54) METHOD AND DEVICE FOR PROVIDING A POSITION OF AT LEAST ONE OBJECT

(71) Applicant: Robert Bosch GmbH, Stuttgart (DE)

(72) Inventors: Holger Mielenz, Ostfildern (DE); Michael Buchholz, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 16/760,182

(22) PCT Filed: Nov. 7, 2018

(86) PCT No.: PCT/EP2018/080484
§ 371 (c)(1),
(2) Date: Apr. 29, 2020

(87) PCT Pub. No.: WO2019/092025
PCT Pub. Date: May 16, 2019

(65) Prior Publication Data
US 2021/0183237 A1 Jun. 17, 2021

(30) Foreign Application Priority Data
Nov. 13, 2017 (DE) .......................... 102017220139.8

(51) Int. Cl.
*G08G 1/01* (2006.01)
*B60W 60/00* (2020.01)
(Continued)

(52) U.S. Cl.
CPC ......... *G08G 1/0116* (2013.01); *B60W 60/001* (2020.02); *G01W 1/02* (2013.01);
(Continued)

(58) Field of Classification Search
CPC ... G08G 1/0116; G08G 1/164; B60W 60/001; B60W 2555/20; B60W 30/09; B60W 30/0956; G01W 1/02
See application file for complete search history.

(56) References Cited

U.S. PATENT DOCUMENTS

| 5,847,755 | A | 12/1998 | Wixson et al. | |
| 7,493,209 | B1 * | 2/2009 | Altrichter | .......... G01C 21/3469 340/902 |

(Continued)

FOREIGN PATENT DOCUMENTS

| DE | 102004051527 A1 | 6/2006 |
| DE | 102012009297 A1 | 12/2012 |

(Continued)

OTHER PUBLICATIONS

Satoru Yoneyama, et al., "Bridge Deflection Measurement Using Digital Image Correlation With Camera Movement Correction", In: Materials Transactions. vol. 53, No. 2, 2012, pp. 285-290.

*Primary Examiner* — Hussein Elchanti
(74) *Attorney, Agent, or Firm* — Norton Rose Fulbright US LLP; Gerard Messina

(57) ABSTRACT

A method for providing a position of at least one object, including receiving surrounding area data values, the surrounding area data values representing a surrounding area of an infrastructure installation, the surrounding area including the at least one object, receiving status data values, the status data values representing a status of the infrastructure installation, determining the position of the at least one object in the surrounding area on the basis of the surrounding area data values and as a function of the status of the infrastructure installation, and providing the position of the at least one object. A device is also provided.

17 Claims, 4 Drawing Sheets

(51) Int. Cl.
*G01W 1/02* (2006.01)
*G08G 1/16* (2006.01)
*B60W 30/09* (2012.01)
*B60W 30/095* (2012.01)

(52) U.S. Cl.
CPC ............ *G08G 1/164* (2013.01); *B60W 30/09* (2013.01); *B60W 30/0956* (2013.01); *B60W 2555/20* (2020.02)

(56) References Cited

U.S. PATENT DOCUMENTS

| | | | | |
|---|---|---|---|---|
| 8,676,273 | B1* | 3/2014 | Fujisaki | H04M 3/533 |
| | | | | 455/567 |
| 8,700,299 | B2* | 4/2014 | Morita | G08G 1/096716 |
| | | | | 701/123 |
| 8,954,226 | B1* | 2/2015 | Binion | G07C 5/008 |
| | | | | 701/33.4 |
| 9,779,314 | B1* | 10/2017 | Wendel | G06K 9/00825 |
| 9,965,951 | B1* | 5/2018 | Gallagher | G08G 1/0133 |
| 10,365,115 | B2* | 7/2019 | Nair | G01C 21/3492 |
| 2007/0263096 | A1 | 11/2007 | Bouzar | |
| 2011/0043348 | A1* | 2/2011 | Blackard | F16H 63/42 |
| | | | | 340/439 |
| 2011/0126797 | A1* | 6/2011 | Russell | F02D 19/0692 |
| | | | | 123/294 |
| 2011/0227757 | A1* | 9/2011 | Chen | G08G 1/0104 |
| | | | | 340/902 |
| 2014/0336913 | A1* | 11/2014 | Fino | G08G 1/096844 |
| | | | | 701/117 |
| 2015/0145995 | A1* | 5/2015 | Shahraray | H04L 67/12 |
| | | | | 348/148 |
| 2016/0148507 | A1* | 5/2016 | Pittman | G06Q 30/0255 |
| | | | | 340/917 |
| 2016/0358463 | A1* | 12/2016 | Cho | G08G 1/04 |
| 2017/0018187 | A1* | 1/2017 | Kim | G08G 1/164 |
| 2017/0154525 | A1* | 6/2017 | Zou | G08G 1/08 |
| 2017/0243485 | A1* | 8/2017 | Rubin | H04W 4/026 |
| 2017/0353350 | A1* | 12/2017 | Gussen | H04B 10/11 |
| 2018/0075739 | A1* | 3/2018 | Ginsberg | G08G 1/0145 |
| 2018/0143628 | A1* | 5/2018 | Samper | B60W 50/12 |
| 2018/0151064 | A1* | 5/2018 | Xu | G08G 1/0116 |
| 2018/0174449 | A1* | 6/2018 | Nguyen | G08G 1/0104 |
| 2018/0253968 | A1* | 9/2018 | Yalla | G08G 1/097 |
| 2018/0286228 | A1* | 10/2018 | Xu | G08G 1/0112 |
| 2019/0096243 | A1* | 3/2019 | Doig | G08G 1/091 |
| 2019/0272747 | A1* | 9/2019 | Raamot | G08G 1/08 |
| 2020/0388163 | A1* | 12/2020 | Zhang | G08G 1/163 |
| 2021/0094577 | A1* | 4/2021 | Shalev-Shwartz | B60W 40/107 |

FOREIGN PATENT DOCUMENTS

| | | |
|---|---|---|
| DE | 102013009860 A1 | 12/2014 |
| DE | 102015205133 A1 | 9/2016 |
| DE | 102016000661 B3 | 5/2017 |
| WO | 2012172526 A1 | 12/2012 |
| WO | 2015055737 A1 | 4/2015 |

* cited by examiner

METHOD AND DEVICE FOR PROVIDING A POSITION OF AT LEAST ONE OBJECT

The present invention relates to a method, as well as to a device for providing a position of at least one object including a step of receiving surrounding area data values, the surrounding area data values representing a surrounding area of an infrastructure installation, the surrounding area including the at least one object, a step of receiving status data values, the status data values representing a status of the infrastructure installation, a step determining the position of the at least one object in the surrounding area on the basis of the surrounding area data values and as a function of the status of the infrastructure installation, and a step of providing the position of the at least one object.

SUMMARY

An example method according to the present invention for providing a position of at least one object includes a step of receiving surrounding area data values, the surrounding area data values representing a surrounding area of an infrastructure installation, the surrounding area including the at least one object, and a step of receiving status data values, the status data values representing a status of the infrastructure installation. The example method also includes a step of determining the position of the at least one object in the surrounding area on the basis of the surrounding area data values and as a function of the status of the infrastructure installation, and a step of providing the position of the at least one object. The at least one object is understood to be a road user (vehicle, bicycle, pedestrian, etc.), for example, and/or an obstacle (rock, cargo lost from a vehicle, fallen trees, signs, etc.) and/or a temporary obstacle (construction site, accident, etc.).

A position of the at least one object is understood to be a specification in GNSS coordinates, for example. In a specific embodiment, a position is understood to be a specification in GNSS coordinates and fuzziness of the position. In a specific embodiment, a position is especially understood to be a highly accurate position which is so precise within a defined coordinate system, for example, GNSS coordinates, that it does not exceed a maximally permissible fuzziness. The maximum fuzziness may thereby depend on the surrounding area, for example. Generally, the maximum fuzziness of a highly accurate position is so small that, in particular a reliable operation (transversal and/or longitudinal control and/or safety-critical functions, etc.) of an automated vehicle is ensured (the maximum fuzziness is on the order of 10 centimeters, for example).

An infrastructure installation is understood to be a street light, for example, and/or a traffic sign (sign, traffic lights, etc.) and/or a gate and/or other installations. Generally, an infrastructure installation is understood to be an installation that includes a driving environment sensor system for capturing a surrounding area of the infrastructure unit, the surrounding area including at least one infrastructure area (an area of a roadway and/or of a parking lot and/or of a bridge and/or of a tunnel, etc.).

A driving environment sensor system is at least a video sensor and/or a radar sensor and/or a lidar sensor and/or an ultrasonic sensor and/or at least one further sensor that is adapted for capturing at least one object in the surrounding area in the form of surrounding area data values in a way that makes it possible for a position of the at least one object to be determined.

The example method according to the present invention advantageously takes into account a status of the infrastructure installation upon determination of the position of the at least one object in the surrounding area of the infrastructure installation. This enhances the accuracy of the specific position and thus also the reliability of the information related thereto.

The infrastructure installation is preferably adapted for executing a movement and/or a deformation, and/or the status includes a direction and/or a measure of the movement and/or of the deformation.

To that end, the infrastructure installation includes a sensor system that is adapted for capturing the status of the infrastructure installation in the form of status data values. For example, to capture a movement and or a deformation, the sensor system includes an acceleration sensor. In another specific embodiment, the sensor system corresponds to the driving environment sensor system, and the status of the infrastructure installation—in particular, a movement and/or a deformation—are/is extracted from the surrounding area data values in the form of status data values. This is achieved, for example, by a comparison with reference surrounding area data values that were captured, in particular, without any movement and/or deformation.

This means, for example, that the infrastructure installation—in particular, under the influence of wind or weather and/or of an airflow induced by a passing vehicle, etc.—executes a movement and/or a deformation which influence(s) the surrounding area data values.

Here, an advantage is derived that a movement and/or a deformation, which notably influence(s) the surrounding area data values, are/is considered, whereby the quality, respectively accuracy of the position of the at least one object is enhanced.

A step of receiving weather status data values is preferably provided, the weather status data representing a weather status in the surrounding area, and the position of the at least one object being additionally determined as a function of the weather status.

A weather status is understood, for example, to be a wind direct on and/or a wind velocity and/or precipitation (rain, snow, hail, etc.) and/or fog and/or an intensity and/or direction of the sunlight, etc.

Here, an advantage is derived that the quality of the position specification is further enhanced by also taking a weather status into account that may, in particular, substantially influence the fuzziness of a positon specification. For example, in the case of fog, it is possible that the position is determined less accurately, resulting in a greater fuzziness of the position.

The position of the at least one object is preferably provided in a way that allows an automated vehicle to be operated at least in the surrounding area as a function of the position of the at least one object.

An automated vehicle is understood to be a partially, highly or fully automated vehicle.

Operation of the automated vehicle is understood to mean that the operation of the automated vehicle is partially, highly or fully automated. The operation thereby includes, for example, determining a trajectory for the automated vehicle and/or driving the trajectory using an automated transversal and/or longitudinal control and/or performing safety-critical driving functions. The automated vehicle is, namely, operated in a way that makes it possible to avoid a collision with the at least one object.

Here, an advantage is derived that, relative to the at least one object, the example method according to the present invention enhances safety in the operation of the automated vehicle.

The device according to the present invention for providing a position of at least one object includes first means for receiving surrounding area data values, the surrounding area data values representing a surrounding area of an infrastructure installation, the surrounding area including the at least one object and second means for receiving status data values, the status data values representing a status of the infrastructure installation. The device also includes third means for determining the position of at least one object in the surrounding area on the basis of surrounding area data values and as a function of the status of the infrastructure installation, and fourth means for providing the position the at least one object.

Further means for receiving weather status data values are preferably provided, the weather status data representing a weather status in the surrounding area.

The first means and/or the second means and/or the third means and/or the fourth means and/or the further means are preferably adapted for executing a method in accordance with the present invention.

Advantageous example embodiments of the present invention are described herein.

BRIEF DESCRIPTION OF THE DRAWINGS

Exemplary embodiments of the present invention are shown in the figures and explained in greater detail below.

DETAILED DESCRIPTION OF EXAMPLE EMBODIMENTS

Figure 1:
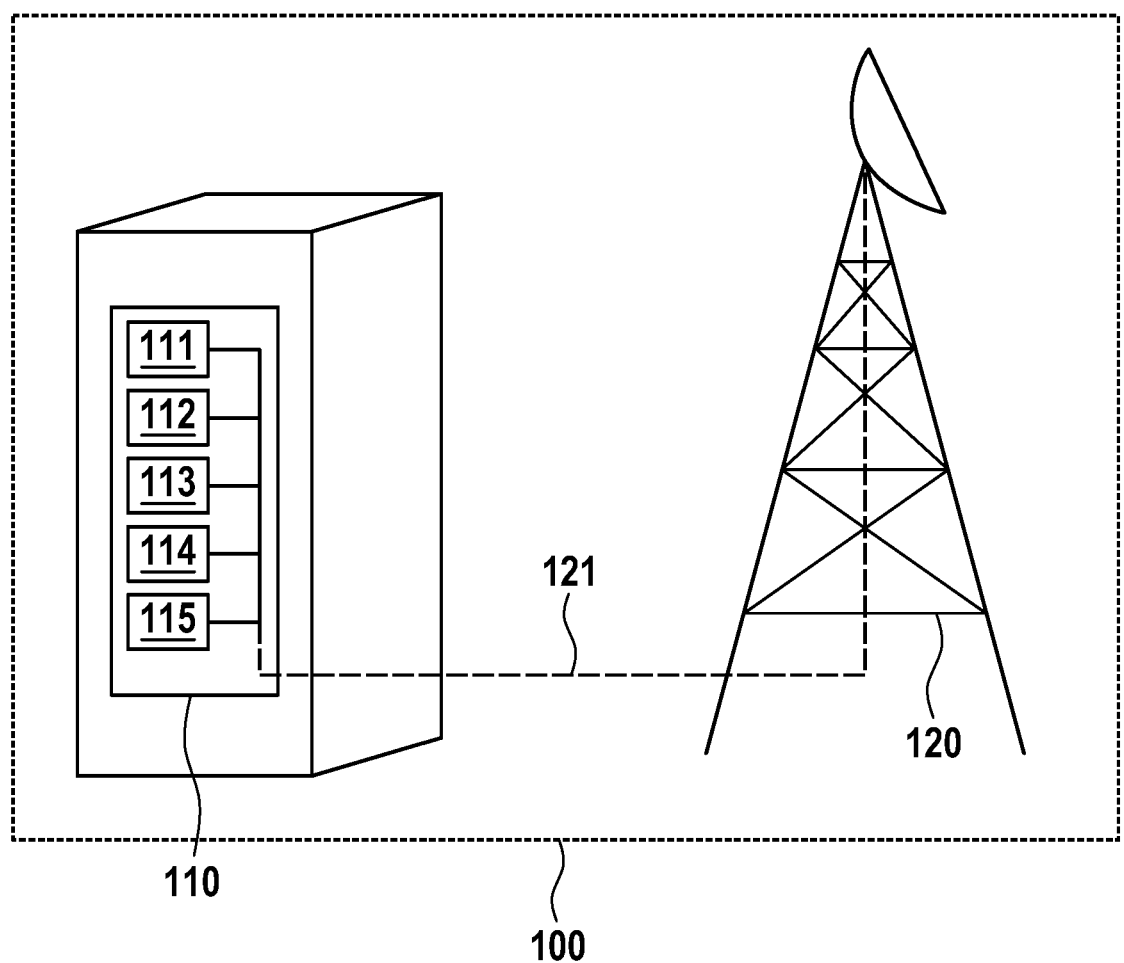
FIG. 1 shows a first exemplary embodiment of the device according to the present invention.

FIG. 1 shows an—exemplarily illustrated—processing unit 100, which includes a device 110 for providing 340 a position 231 of at least one object 230. A processing unit 100 is understood to be a server, for example. In another specific embodiment, a processing unit 100 is understood to be a cloud, thus a network of at least two electrical data processing systems, which exchange data over the Internet, for example. In another specific embodiment, processing unit 100 corresponds to device 110.

Device 110 includes first means 111 for receiving 310 surrounding area data values, the surrounding area data values representing a surrounding area 220 of an infrastructure installation 210, surrounding area 220 including the at least one object 230 and second means 112 for receiving 320 status data values; the status data values representing a status of infrastructure installation 210. Device 110 also includes third means 113 for determining 330 position 231 of the at least one object 230 in the surrounding area 220 on the basis of surrounding area data values and as a function of the status of infrastructure installation 210, and fourth means 114 for providing 340 position 231 of the at least one object 230. In a specific embodiment, further means 115 are additionally provided for receiving 325 weather status data values, the weather status data representing a weather status in surrounding area 220.

In various specific embodiments, first means 111 and/or second means 112 and/or third means 113 and/or fourth means 114 and/or further means 115 may likewise be designed as a function of the particular specific embodiment of processing unit 100. If processing unit 100 is server-based, first means 111 and/or second means 112 and/or third means 113 and/or fourth means 114 and/or further means 115 are localized at the same location relative to the location of device 110.

If processing unit 100 is cloud-based, first means 111 and/or second means 112 and/or third means 113 and/or fourth means 114 and/or further means 115 are localized different locations, for example, in different cities and/or in different countries; a connection, such as the Internet, for example, being formed for exchanging (electronic) data between first means 111 and/or second means 112 and/or third means 113 and/or fourth means 114 and/or further means 115.

First means 111 are adapted for receiving surrounding area data values, the surrounding area data values representing a surrounding area 220 of an infrastructure installation 210, surrounding area 220 including the at least one object 230. To that end, first means 111 are designed as a receiver unit and/or transmitter unit, which are/is used for requesting and/or receiving data. In another specific embodiment, first means 111 are adapted to be linked via a wired and/or wireless connection 121 to a transmitter unit and/or receiver unit 122, which, proceeding from device 110, are/is disposed externally therefrom. In addition, first means 111 also include electronic data processing elements, for example, a processor, main memory and a hard disk dive that are designed for storing and/or processing the surrounding area data values, for example, for executing a change to and/or adaptation of the data format and for subsequently retransmitting the same to third means 113. In another specific embodiment, first means 111 are designed for retransmitting the received surrounding area data values—without data processing elements—to third means 113.

Furthermore, the device includes second means 112 designed for receiving status data values, the status data values representing a status of infrastructure installation 210. To that end, second means 112 are designed as a receiver unit and/or transmitter unit, which are/is used for requesting and/or receiving data. Second means 112 correspond at least to a specific embodiment of first means 111 and/or are identical to first means 111.

In a specific embodiment, device 110 also includes other means 115 adapted for receiving weather status data values, the weather status data values representing a weather status in surrounding area 220. In a specific embodiment, the weather status data values are received from an external server, for example, a weather service. In another specific embodiment, the weather status data values are directly received from infrastructure installation 210. To that end, further means 115 are designed as a receiver unit and/or transmitter unit, which are/is used for requesting and/or receiving data. Further means 115 correspond at least to a specific embodiment of first means 111 and/or second means 112 and/or are identical to first means 111 and/or second means 112.

Device 110 also includes third means 113, which are adapted for determining position 231 of the at least one object 230 in surrounding area 220 on the basis of surrounding area data values and as a function of the status of infrastructure installation 210. To that end, third means 113 are designed as a processing unit, for example, which includes electronic data processing elements, for example, a processor, a main memory and a hard disk drive. In addition, third means 113 include a suitable software which is designed for determining position 231 of the at least one object 230 on the basis of the surrounding area data values and as a function of the status of infrastructure installation 210. Position 231 is determined, for example, by ascertaining a first position of the at least one object 230 on the basis of the surrounding area data values. This is achieved, for example, using object detection methods that are based on the disparity principle. The first position is subsequently adapted as a function of the status of infrastructure installation 210, for example, of a constant movement caused by wind, etc., and determined as position 231 of the at least one object 230, by the movement of infrastructure installation 210 being eliminated from the calculation accordingly—for example, by vector addition.

Furthermore, device 110 includes fourth means 114, which are designed for providing position 231 of the at least one object 230. To that end, in a specific embodiment, fourth means 114 are configured as a data interface. In another specific embodiment, fourth means 114 are additionally or alternatively designed as a receiver unit and/or transmitter unit, which are/is used for requesting and/or receiving data. Fourth means 114 of at least one specific embodiment thereby correspond to first means 111 and/or second means 112 and/or further means 115 and/or are identical to first means 111 and/or to second means 112 and/or to further means 115.

Figure 2:
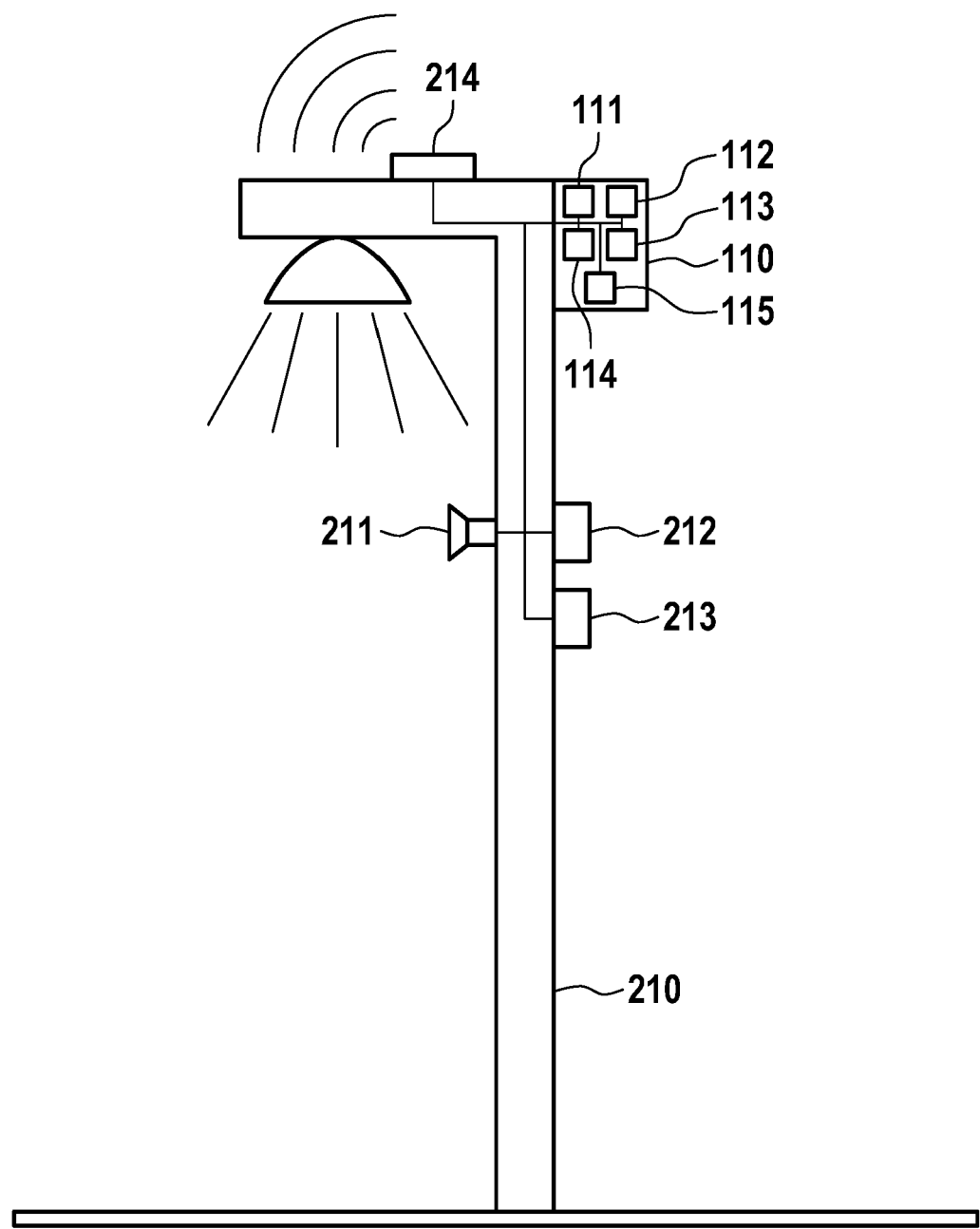
FIG. 2 shows a second exemplary embodiment of the device according to the present invention.

FIG. 2 shows an infrastructure installation 210, which is designed here purely exemplarily as an illumination unit in the form of a street lamp. In this specific embodiment, infrastructure unit 210 includes device 110 directly.

Device 110 includes first means 111 for receiving 310 surrounding area data values, the surrounding area data values representing a surrounding area 220 of an infrastructure installation 210, surrounding area 220 including the at least one object 230 and second means 112 for receiving 320 status data values, the status data values representing a status of infrastructure installation 210. Furthermore, device 110 includes third means 113 for determining 330 position 231 of the at least one object 230 in surrounding area 220 on the basis of surrounding area data values and as a function of the status of infrastructure installation 210, and fourth means 114 for providing 340 position 231 of the at least one object 230. In a specific embodiment, further means 115 are additionally provided for receiving 325 weather status data values, the weather status data representing a weather status in surrounding area 220.

First means 111 are adapted for receiving surrounding area data values, the surrounding area data values representing a surrounding area 220 of an infrastructure installation 210, surrounding area 220 including the at least one object 230. To that end, first means 111 are designed as a data interface, which is used for requesting and/or receiving data. For example, first means 111 are linked by a cable and/or by a wireless connection (for example, Bluetooth) to a driving environment sensor device 211 included in infrastructure device 210. First means 111 include electronic data processing elements, for example, a processor, a main memory and a hard disk drive that are designed for storing and/or processing the surrounding area data values, for example, for executing a change to and/or adaptation of the data format and for subsequently retransmitting the same to third means 113. In another specific embodiment, first means 111 are designed for retransmitting the received surrounding area data values—without data processing elements—to third means 113.

The device also includes second means 112 adapted for receiving status data values, the status data values representing a status of infrastructure installation 210. To that end, second means 112 are designed as a data interface, which is used for requesting and/or receiving data. For example, second means 112 are linked by a cable and/or by a wireless connection (for example, Bluetooth) to a sensor system 212 which is adapted for capturing the status of infrastructure installation 210 in the form of status data values. Second means 112 include electronic data processing elements, for example, a processor, a main memory and a hard disk drive, which are designed for storing and/or processing the status data values, for example, for executing a change to and/or adaptation of the data format and for subsequently retransmitting the same to third means 113. In another specific embodiment, second means 112 are designed for retransmitting the received stat s data values—without data processing elements—to third means 113.

In a specific embodiment, device 110 also includes other means 115 adapted for receiving weather status data values, the weather status data values representing a weather status in surrounding area 220. In a specific embodiment, further means 115 are designed as a data interface, for example, which is used for requesting and/or receiving data. For example, further means 115 are linked by a cable and/or by a wireless connection (for example, Bluetooth) to a weather sensor 213, which is adapted for capturing the weather status in surrounding area 220 of infrastructure installation 210 in the form of weather status data values. Further means 115 include electronic data processing elements, for example, a processor, a main memory and a hard disk drive that are designed for storing and/or processing the weather status data values, for example, for executing a change to and/or adaptation of the data format and for subsequently retransmitting the same to third means 113. In another specific embodiment, further means 115 are designed for retransmitting the received weather status data values—without data processing elements—to third means 113.

In another specific embodiment, further means 115 are designed as a receiver unit and/or transmitter unit, which are/is used for requesting and/or receiving data, or connected to a receiver unit and/or transmitter unit 214 included in infrastructure installation 210. The weather status data values are received by an external server, for example, a weather service. Device 110 also includes third means 113, which are adapted for determining position 231 of the at least one object 230 in surrounding area 220 on the basis of surrounding area data values and as a function of the status of infrastructure installation 210. To that end, third means 113 are designed as a processing unit, for example, which includes electronic data processing elements, for example, a processor, a main memory and a hard disk drive. In addition, third means 113 include a suitable software which is designed for determining position 231 of the at least one object 230 on the basis of the surrounding area data values and as a function of the status of infrastructure installation 210. Position 231 is determined, for example, by ascertaining a first position of the at least one object 230 on the basis of the surrounding area data values. This is achieved, for example, using object detection methods that are based on the disparity principle. The first position is subsequently adapted as a function of the status of infrastructure installation 210, for example, of a constant movement caused by wind, etc., and determined as position 231 of the at least one object 230, by the movement of infrastructure installation 210 being eliminated from the calculation accordingly—for example, by vector addition.

Furthermore, device 110 includes fourth means 114, which are designed for providing position 231 of the at least one object 230. To that end, in a specific embodiment, fourth means 114 are configured as a data interface. In another specific embodiment, fourth means 114 are additionally or alternatively designed as a receiver unit and/or transmitter unit, which are/is used for requesting and/or receiving data. In another specific embodiment, fourth means 114 are additionally or alternatively configured as a data interface in a way that allows fourth means 114 to be connected to a receiver unit and/or transmitter unit 214 that is included in infrastructure installation 210.

Figure 3:
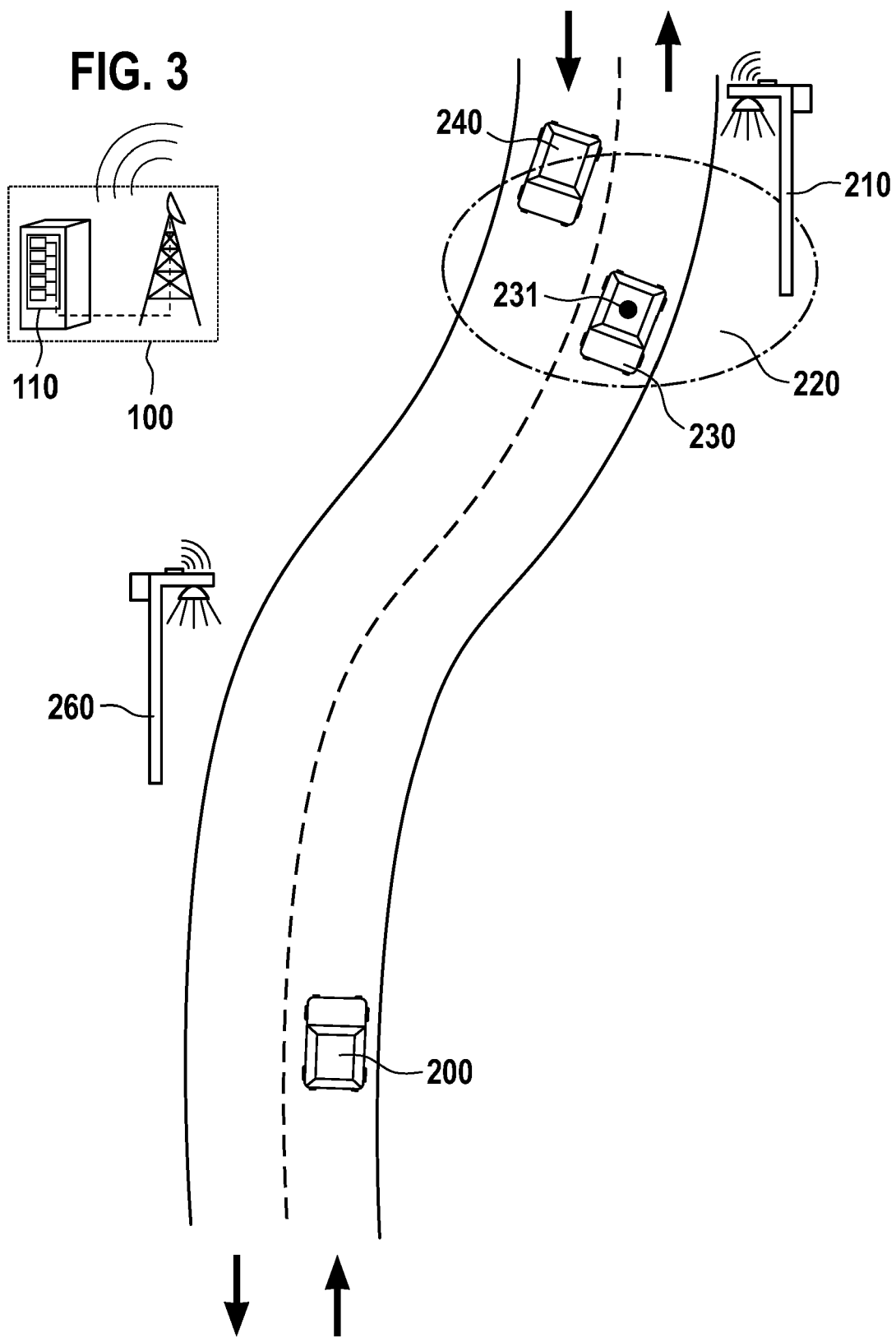
FIG. 3 shows an exemplary embodiment of the method according to the present invention.

FIG. 3 shows an exemplary embodiment of method 300 according to the present invention. An automated vehicle 200 is thereby located on a two-lane road having one lane per direction of travel. In this exemplary embodiment, infrastructure installation 210 is designed as an illumination unit, in particular as a street lamp, the exemplarily illustrated road section including a further infrastructure installation 260, which, for example, is likewise designed to include a surrounding area.

Here, the infrastructure installation captures at least one object 230, which, here, is in the form of a vehicle and passes another vehicle 240 in a way that allows the at least one object 230 to use the lane of automated vehicle 200 therefor. Since the passing maneuver takes place in surrounding area 220 of infrastructure installation 210, the at least one object 230 is captured and transmitted to first means 111 of device 110, respectively received as surrounding area data values from first means 111.

In addition, status data values, which represent a status infrastructure installation 210, are captured and likewise transmitted to device 110, respectively received by second means 112 of device 110.

Position 231 of the at least one object 230 in surrounding area 220 is determined on the basis of surrounding area data values and as a function of the status of infrastructure installation 210 and provided in this exemplary embodiment in a way that allows automated vehicle 200 to receive this position 231 via a transmitter unit and/or receiver unit adapted therefor and to be operated as a function of position 231 of the at least one object 230. For example, the velocity of automated vehicle 200 is reduced to an extent that makes it possible to avoid a collision with the at least one object 230.

In a specific embodiment, weather status data values, for example, are additionally requested from an external weather service, and position 231 of the at least one object 230 is additionally determined 330 as a function of the weather status. In another specific embodiment, the weather sensor is included in the infrastructure installation. In another specific embodiment, the weather status data values are derived, for example, from the surrounding area data values and/or the status data values by precipitation being recognized, for example, via the surrounding area data values, and/or a wind being recognized via the status data values.

Figure 4:
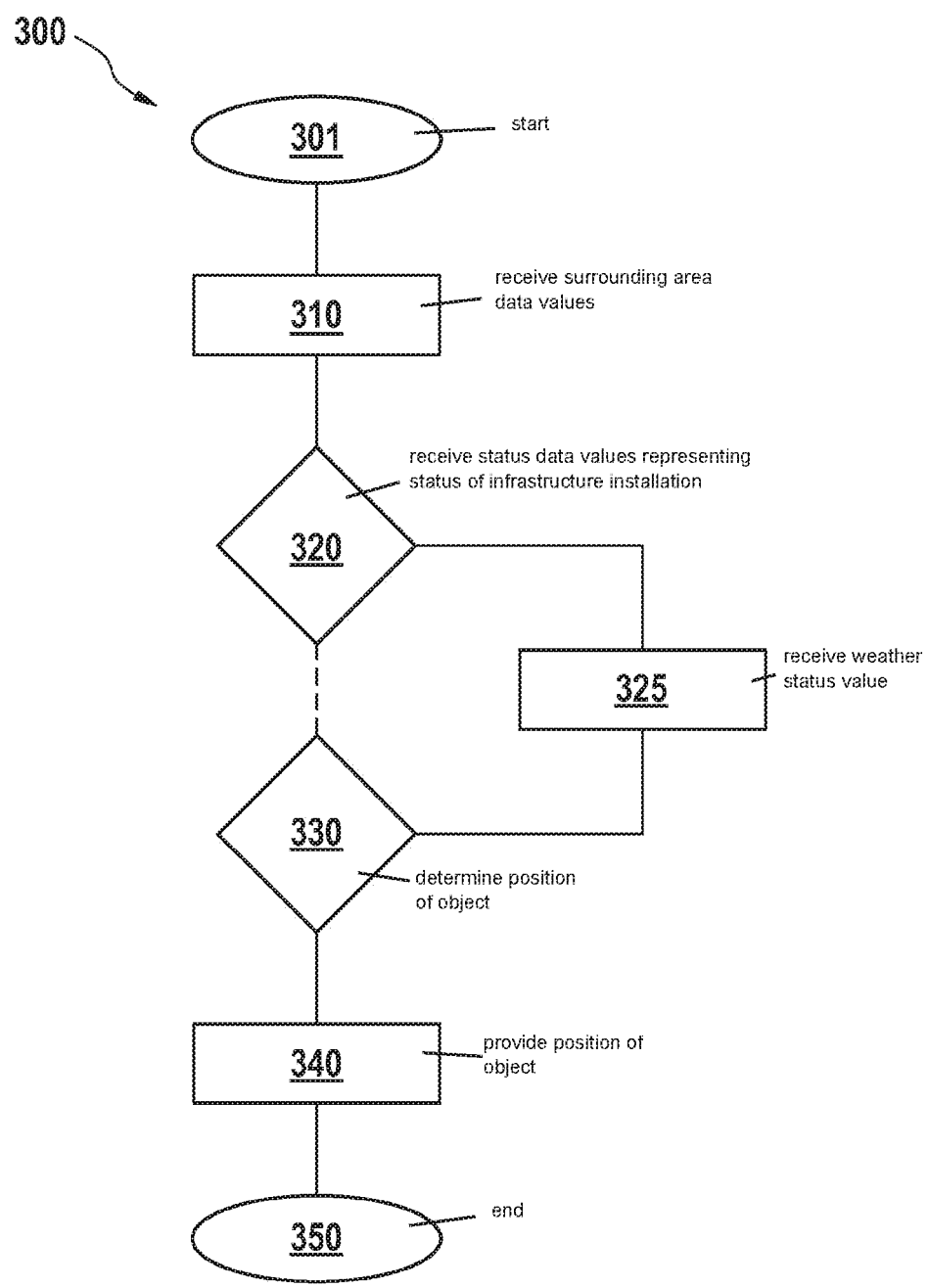
FIG. 4 shows an exemplary embodiment of the method according to the present invention in the form of a flow chart.

FIG. 4 shows an exemplary embodiment of a method 300 for providing 340 a position 231 of at least one object 230.

Method 300 begins in step 301.

Surrounding area data values are received in step 310, the surrounding area data values representing a surrounding area 220 of an infrastructure installation 210, surrounding area 220 including the at least one object 230.

In step 320, status data values are received, the status data values representing a status of infrastructure installation 210.

In a specific embodiment, step 325 follows, weather status data values being received in step 325, the weather status data representing a weather status in surrounding area 220. Step 330 subsequently follows.

In another specific embodiment, step 330 directly follows step 320.

Steps 310 and 320 and/or steps 310, 320 and 325 may be executed in any sequence, depending on the particular specific embodiment.

In step 330, position 231 of the at least one object 230 in surrounding area 220 is determined on the basis of surrounding area data values and as a function of the status of infrastructure installation 210. If step 325 is also executed in advance, position 231 of the at least one object 230 is additionally determined as a function of the weather status.

In step 340, position 231 of the at least one object 230 is provided.

Method 300 ends in step 350.

What is claimed is:

1. A method using a sensor system of an infrastructure installation that includes a surrounding area sensor and a movement sensor, the method comprising:
the surrounding area sensor sensing a current detected position of an object in a surrounding area of the infrastructure installation;
the movement sensor sensing a movement or deformation status of the infrastructure installation when the current detected position of the object is sensed;
a processor modifying the current detected position of the object in the surrounding area based on the sensed movement status of the infrastructure installation, the modifying yielding a current actual position of the object in the surrounding area when the surrounding area sensor sensed the current detected position of the object; and
providing the current actual position of the object in the surrounding area.

2. The method as recited in claim 1, wherein the movement or deformation status includes a direction and/or a measure of a movement and/or of a deformation of the infrastructure installation.

3. The method as recited in claim 1, further comprising the following step:
receiving weather status data values, the weather status data representing a weather status in the surrounding area, wherein the current actual position of the object is additionally determined as a function of the weather status.

4. The method as recited in claim 1, wherein the providing includes transmitting the current actual position of the object to an automated vehicle that is configured to perform an automated operation, at least in the surrounding area, as a function of the transmitted current actual position of the object.

5. A system of an infrastructure installation, the system comprising:
a sensor system that includes a surrounding area sensor and a movement sensor;
a processor; and
a transmitter;
wherein:
the surrounding area sensor is configured to sense a current detected position of an object in a surrounding area of the infrastructure installation the movement sensor is configured to sense a movement or deformation status of the infrastructure installation when the current detected position of the object is sensed; and the processor is configured to:
modify the current detected position of the object in the surrounding area based on the sensed movement status of the infrastructure installation, the modification yielding a current actual position of the object in the surrounding area when the surrounding area sensor sensed the current detected position of the object; and
use the transmitter to provide the current actual position of the object in the surrounding area.

6. The system as recited in claim 5, further comprising:
a device configured to receive weather status data values, the weather status data representing a weather status in the surrounding area.

7. The system as recited in claim 6, wherein the movement or deformation status includes a direction and/or a measure of a movement and/or of a deformation of the infrastructure installation.

8. The system as recited in claim 6, wherein the surrounding area sensor includes at least one of a camera, a radar sensor, a lidar sensor, and an ultrasonic sensor.

9. The system as recited in claim 6, wherein the movement sensor includes an acceleration sensor.

10. The system as recited in claim 9, wherein the surrounding area sensor includes at least one of a camera, a radar sensor, a lidar sensor, and an ultrasonic sensor.

11. The system as recited in claim 9, wherein an installation position of the infrastructure installation is fixed relative to the surrounding area.

12. The system as recited in claim 11, wherein the infrastructure installation is a traffic sign.

13. The system as recited in claim 11, wherein the infrastructure installation is traffic light.

14. The system as recited in claim 11, wherein the infrastructure installation is a gate.

15. The system as recited in claim 11, wherein the surrounding area sensor includes at least one of a camera, a radar sensor, a lidar sensor, and an ultrasonic sensor.

16. The system as recited in claim 6, wherein the movement or deformation status includes a measure of swaying by the infrastructure installation.

17. The system as recited in claim 9, wherein the processor is configured to perform the modification by applying a sensed movement of the infrastructure installation to the current detected position using vector addition.

* * * * *